United States Patent
Guo et al.

(10) Patent No.: US 11,156,746 B2
(45) Date of Patent: *Oct. 26, 2021

(54) LIGHT DIFFUSING POLYMER COMPOSITION, METHOD OF PRODUCING THE SAME, AND ARTICLES MADE THEREFROM

(71) Applicant: Rohm and Haas Company, Philadelphia, PA (US)

(72) Inventors: Hailan Guo, Warrington, PA (US); Eric Lundquist, North Wales, PA (US)

(73) Assignee: Rohm and Haas Company, Philadelphia, PA (US)

( * ) Notice: Subject to any disclaimer, the term of this patent is extended or adjusted under 35 U.S.C. 154(b) by 743 days.

This patent is subject to a terminal disclaimer.

(21) Appl. No.: 14/418,477

(22) PCT Filed: Aug. 5, 2013

(86) PCT No.: PCT/US2013/053546
§ 371 (c)(1),
(2) Date: Jan. 30, 2015

(87) PCT Pub. No.: WO2014/025657
PCT Pub. Date: Feb. 13, 2014

(65) Prior Publication Data
US 2015/0168604 A1    Jun. 18, 2015

Related U.S. Application Data

(60) Provisional application No. 61/681,844, filed on Aug. 10, 2012.

(51) Int. Cl.
| G02B 1/04 | (2006.01) |
| B29C 43/24 | (2006.01) |
| B29C 45/00 | (2006.01) |
| B29C 51/00 | (2006.01) |
| B29D 11/00 | (2006.01) |
| C08L 69/00 | (2006.01) |
| G02B 5/02 | (2006.01) |
| B29L 11/00 | (2006.01) |

(52) U.S. Cl.
CPC .......... *G02B 1/04* (2013.01); *B29C 43/24* (2013.01); *B29C 45/0001* (2013.01); *B29C 51/002* (2013.01); *B29D 11/00798* (2013.01); *C08L 69/00* (2013.01); *G02B 5/0268* (2013.01); *B29L 2011/00* (2013.01); *C08L 2203/20* (2013.01); *C08L 2205/22* (2013.01)

(58) Field of Classification Search
CPC ........ G02B 1/04; G02B 5/0268; B29C 43/24; B29C 45/0001; B29C 51/002; B29D 11/00798; C08L 69/00; C08L 2203/20; C08L 2205/22; B29L 2011/00

USPC ........... 525/185, 85; 264/1.1; 252/500, 582; 524/86

See application file for complete search history.

(56) References Cited

U.S. PATENT DOCUMENTS

| 5,237,004 | A  | * | 8/1993 | Wu | ................ C08F 265/04 525/228 |
| 2006/0100322 | A1 | * | 5/2006 | Kang | ................ C08L 67/02 524/86 |
| 2008/0182598 | A1 |   | 7/2008 | Lafleuer et al. | |

FOREIGN PATENT DOCUMENTS

| EP | 0342283 | 5/1988 |
| EP | 1950244 | 1/2008 |
| EP | 1950244 A1 | 7/2008 |
| JP | H1046018 | 2/1988 |
| JP | 05179147 | 7/1993 |
| JP | 09176366 | 7/1997 |
| JP | 07114331 | 5/2007 |
| JP | 07204695 | 8/2007 |
| WO | WO2006/100127 | 9/2006 |
| WO | WO2008/045181 | 4/2008 |
| WO | WO2011/134674 | * 11/2011 |

OTHER PUBLICATIONS

EP Response to Office Action dated Sep. 21, 2015; from EP counterpart Application No. 13747629.7.
Taiwan Office Action; from Taiwan counterpart Application No. 102127090.

(Continued)

*Primary Examiner* — Ling Siu Choi
*Assistant Examiner* — Ronald Grinsted
(74) *Attorney, Agent, or Firm* — Brian L. Mutschler

(57) ABSTRACT

A composition comprising: a blended product of: a matrix polymer; and from 0.05 to 2.5 wt % diffuser polymer particles, wherein the diffuser polymer particles are characterized by an average diameter from 2 to 20 micrometers, a particle size distribution such that at least 90 wt % of the polymer particles fall within ±30% of the volume average particle size, a crosslinking level greater than 4%; and wherein the diffuser polymer particles comprise units derived from at least one alkyl(meth)acrylate monomer, from 5 wt % to 25 wt % units derived from a crosslinking monomer selected from the group consisting of aliphatic crosslinking monomers, aromatic crosslinking monomers and combinations thereof, optionally, units derived from one or more comonomers selected from the group consisting of aryl(meth)acrylate monomers and monovinyl arenes; and wherein from 0.1 to 20 wt % one or more performance additives dispersed within the diffuser polymer particles is provided.

15 Claims, No Drawings

(56) References Cited

OTHER PUBLICATIONS

Singapore Response to Office Action dated May 27, 2016; from Singapore counterpart Application No. 11201500971S.
Singapore Office Action; from Singapore counterpart Application No. 11201500971S.
EP Response to Office Action dated Feb. 22 2016; from EP counterpart Application No. 13747629.7.
Singapore Office Action dated Jan. 11, 2016; from Singapore counterpart Application No. 112015009715.
EP Examination Report dated Dec. 3, 2015; from EP counterpart Application No. 13747629.7.
Chinese Office Action dated Jan. 28, 2016; from Chinese counterpart Application No. 201380051725.7.
Chinese Third Office Action; from Chinese counterpart Application No. 201380051725.7.
Japanese Office Action; from Japanese counterpart Application No. 2015-526596.
Chinese Office Action dated Aug. 31, 2016; from Chinese counterpart Application No. 201380051725.7.
Chinese Response to Office Action dated Jun. 12, 2016; from Chinese counterpart Application No. 201380051725.7.
Search Report dated Jan. 23, 2014, from PCT counterpart Application No. PCT/US2013/053546.
IPRP dated Feb. 19, 2015; from PCT counterpart Application No. PCT/US2013/053546.
EP Office Action dated Mar. 17, 2015; from EP counterpart Application No. 13747629.7.
Chinese Office Action; from Chinese counterpart Application No. 201380051725.7.
Brazilian Office Action; from counterpart BR Application No. BR112015002802.2.

* cited by examiner

LIGHT DIFFUSING POLYMER COMPOSITION, METHOD OF PRODUCING THE SAME, AND ARTICLES MADE THEREFROM

FIELD OF INVENTION

The instant invention relates to a light diffusing polymer composition, method of producing the same, articles made therefrom, and methods for making such articles.

BACKGROUND OF THE INVENTION

A light-emitting diode (LED) is a semiconductor light source which provides a more energy efficient and eco-friendly lighting alternative. Because of their low energy consumption and low maintenance features, LEDs have been used widely as status indicators and displays on a variety of equipment and display devices. Because of these benefits, there are numerous legislative and regulatory efforts to mandate the use of LEDs as the primary lighting option for residential, industrial and office spaces.

LEDs produce very bright white, unidirectional focused light. Therefore, LED light output often appears harsh and may cause uncomfortable glare. Adequate packaging materials, such as bulb and tube covers, plastic boards and/or sheets embedded with light scattering particles or embossing are currently used to diffuse the LED light and to provide more even illumination and to lessen glare. Plastics used in such lighting applications include polycarbonate (PC), polymethylmethacrylate (PMMA), polyethylene terephtalate (PET) and polystyrene (PS). Both inorganic particles, such as $TiO_2$ particles, and organic particles, such as cross-linked polymethylmethacrylate, polystyrene and/or silicone beads, are currently used as scattering media or light diffusers. However, light diffusing beads can also lead to light transmission loss, which could significantly reduce the efficiency of LED lighting options. Therefore, a need exists for LED diffusers which provide high light transmission while maintaining adequate diffusivity. Other needs in LED lighting include the need for fire resistance, the need to control light color and temperature, and the need to vary the refractive index depending on the application and device.

SUMMARY OF THE INVENTION

The instant invention is a light diffusing polymer composition, method of producing the same, articles made therefrom, and methods for making such articles.

In one embodiment, the instant invention provides a composition comprising: a blended product of: a matrix polymer; and from 0.05 to 2.5 wt % diffuser polymer particles, wherein the diffuser polymer particles are characterized by an average diameter from 2 to 20 micrometers, a particle size distribution such that at least 90 wt % of the polymer particles fall within ±30% of the volume average particle size, a crosslinking level greater than 4 wt %; and wherein the diffuser polymer particles comprise units derived from at least one alkyl(meth)acrylate monomer, from 5 wt % to 25 wt % units derived from a crosslinking monomer selected from the group consisting of aliphatic crosslinking monomers, aromatic crosslinking monomers and combinations thereof, optionally, units derived from one or more comonomers selected from the group consisting of aryl(meth)acrylate monomers and monovinyl arenes; and wherein from 0.1 to 20 wt % one or more performance additives are dispersed within the diffuser polymer particles.

DETAILED DESCRIPTION OF THE INVENTION

The instant invention is a light diffusing polymer composition, method of producing the same, articles made therefrom, and methods for making such articles.

The light diffusing composition according to the present invention comprises: a blended product of: a matrix polymer; and from 0.05 to 2.5 wt % diffuser polymer particles, wherein the diffuser polymer particles are characterized by an average diameter from 2 to 20 micrometers, a particle size distribution such that at least 90 wt % of the polymer particles fall within ±30% of the volume average particle size, a crosslinking level greater than 4 wt %; and wherein the diffuser polymer particles comprise units derived from at least one alkyl(meth)acrylate monomer, from 5 wt % to 25 wt % units derived from a crosslinking monomer selected from the group consisting of aliphatic crosslinking monomers, aromatic crosslinking monomers and combinations thereof, optionally, units derived from one or more comonomers selected from the group consisting of aryl(meth)acrylate monomers and monovinyl arenes; and wherein from 0.1 to 20 wt % one or more performance additives are dispersed within the diffuser polymer particles.

The terms "μ," "μm," and "micrometers" are used synonymously herein.

As used herein, the term (meth)acrylate means acrylate, methacrylate, or combinations of acrylate and methacrylate. For example, the term methyl(meth)acrylate may mean solely methyl methacrylate, solely methyl acrylate or a combination of methyl methacrylate and methyl acrylate.

As used herein, the term "performance additive" means non polymerizable materials that are dissolved or dispersed in the monomer prior to polymerization to form, after polymerization, a polymer diffuser particle containing one or more performance additives. Performance enhancing additives include refractive index changing agents, flame retardants, pigments, dyes and other additives capable of altering the chemical and/or physical properties of the polymer diffuser particle.

In another embodiment, the instant invention provides a method of producing the light diffusing composition comprising copolymerizing at least one alkyl(meth)acrylate monomer copolymerized with from 5 wt % to 25 wt % crosslinking monomer selected from the group consisting of aliphatic crosslinking monomer, aromatic crosslinking monomer and combinations thereof in the presence of one or more performance additives to form diffuser polymer particles; and blending the diffuser polymer particles into a matrix polymer wherein the diffuser polymer particles are present in the composition at a level from 0.05 to 2.5 wt % based on the weight of the matrix polymer plus the weight of the diffuser polymer particle; wherein the copolymerization process to produce the light diffusing particle is selected from the group consisting of suspension polymerization, emulsion polymerization, or a combination thereof; and wherein the performance additives are non-polymerizable in the copolymerization process such that the performance additives are dispersed in the diffuser polymer particles.

In another embodiment, the instant invention provides articles comprising the light diffusing composition according to the present invention.

In another embodiment, the instant invention provides a method for making articles according to the present invention which comprises forming one or more light diffusing compositions into an article wherein the forming comprises thermoforming, extruding, calendaring, injection molding, or any combination thereof.

Matrix polymers useful in the invention may include any one or combination of two or more polymers in which the diffuser polymer particles may be blended or dispersed.

In an alternative embodiment, the instant invention provides a light diffusing composition, method of producing the same, articles made therefrom, and method of making such articles, in accordance with any of the preceding embodiments, except that the matrix polymer is selected from the group consisting of polycarbonates, polymethylmethacrylate, polystyrene, styrene-acrylonitrile copolymers, polystyrene methacrylate copolymers, styrene-methyl methacrylate copolymers, olefin-vinyl acetate copolymers, polymethylpentene, polyethylene, polypropylene, copolymers of polyethylene and polypropylene, polyglutarimide, styrene-maleic anhydride, copolymers, cyclic olefin copolymers, polyesters, polyethylene terephthalate, and combinations thereof.

In an alternative embodiment, the instant invention provides a composition, method of producing the same, articles made therefrom, and method of making such articles, in accordance with any of the preceding embodiments, except that the matrix polymer is one or more polycarbonates.

The light diffusing polymer composition comprises from 0.05 to 2.5 wt % diffuser polymer particles. All individual values and subranges from 0.05 to 2.5 wt % are included herein and disclosed herein; for example, the amount of diffuser polymer particles can be from a lower limit of 0.05, 0.1, 0.5, 1.0, 1.25, 1.75, 2.0, or 2.5 wt % to an upper limit of 0.1, 0.75, 1.0, 1.5, 1.85, 2.5, or 2.75 wt %. For example, the amount of diffuser polymer particles may be in the range of from 0.05 to 2.5 wt %, or in the alternative, the amount of diffuser polymer particles may be in the range of from 0.5 to 1.75 wt %, or in the alternative, the amount of diffuser polymer particles may be in the range of from 1.0 to 2.25 wt %, or in the alternative, the amount of diffuser polymer particles may be in the range of from 0.1 to 1.5 wt %.

Diffuser polymer particles average particle sizes discussed herein are volume average particle sizes.

In one embodiment, the diffuser polymer particles are characterized by a unimodal average diameter.

The diffuser polymer particles are characterized by an average diameter from 2 to 20 micrometers (or $\mu$). All individual values and subranges from 2 to 8$\mu$ are included herein and disclosed herein; for example, the average diameter of the diffuser polymer particle can be from a lower limit of 2, 2.5, 3, 3.6, 4.1, 4.8, 5.5, 6, 6.9, 7.4, or 7.8$\mu$ to an upper limit of 2.8, 3.4, 3.9, 4.25, 5, 5.75, 6.2, 7, 7.5 or 8$\mu$. For example, the average diameter of the diffuser polymer particle may be in the range of from 2 to 8$\mu$, or in the alternative, the average diameter of the diffuser polymer particle may be in the range of from 2.75 to 6.8$\mu$, or in the alternative, the average diameter of the diffuser polymer particle may be in the range of from 3 to 7.0$\mu$, or in the alternative, the average diameter of the diffuser polymer particle may be in the range of from 2 to 5$\mu$, or in the alternative, the average diameter of the diffuser polymer particle may be in the range of from 4.8 to 8$\mu$.

The diffuser polymer particles are characterized by a particle size distribution such that at least 90 wt % of the diffuser polymer particles fall within ±30% of the volume average particle size. All individual values and subranges from at least 90 wt % are included herein and disclosed herein; for example, the wt % of diffuser polymer particles which fall within ±30% of the volume average particle size can be from a lower limit of 90, 92, 94, 96 or 98 wt %.

Narrower particle size distributions are also included herein and disclosed herein. For example, at least 90 wt % of the diffuser polymer particles may fall within ±30% of the volume average particle size, or in the alternative, within ±25% of the volume average particle size, or in the alternative, within ±20% of the volume average particle size, or in the alternative, within ±15% of the volume average particle size.

Alternatively more than 1 particle size distribution each with at least 90 wt % of the diffuser polymer particles falling within ±30% of the volume average particle size of that distribution. All individual values and subranges from at least 90 wt % are included herein and disclosed herein; for example, the wt % of diffuser polymer particles which fall within ±30% of the volume average particle size of that distribution can be from a lower limit of 90, 92, 94, 96 or 98 wt %.

In an alternative embodiment, the instant invention provides a light diffusing composition, method of producing the same, articles made therefrom, and method of making such articles, in accordance with any of the preceding embodiments, except that the diffuser polymer particles exhibit bimodal, trimodal, or quadramodal particle size distribution.

In an alternative embodiment, the instant invention provides a light diffusing composition, method of producing the same, articles made therefrom, and method of making such articles, in accordance with any of the preceding embodiments, except that the diffuser polymer particles exhibit a bimodal particle size distribution.

In an alternative embodiment, the instant invention provides a light diffusing composition, method of producing the same, articles made therefrom, and method of making such articles, in accordance with any of the preceding embodiments, except that the diffuser polymer particles have a bimodal particle size distribution which includes a smaller particle size peak centered at some size between 2.25 and 2.75$\mu$, and a larger particle size peak centered at some size between 5 and 6$\mu$. All individual values between 2.25 and 2.75 are included herein and disclosed herein; for example, the smaller particle size peak may be centered at 2.25, 2.33, 2.4, 2.48, 2.51, 2.57, 2.63, 2.69, 2.71, 2.73 or 2.75$\mu$. All individual values between 5 and 6$\mu$, are included herein and disclosed herein; for example, the smaller particle size peak may be centered at 5, 5.14, 5.19, 5.23, 5.31, 5.37, 5.4, 5.46, 5.63, 5.69, 5.7, 5.75, 5.82, 5.87, or 6$\mu$.

The diffuser polymer particles are characterized by, a refractive index, RI, from 1.40 to 1.70. All individual values and subranges from 1.40 to 1.70 are included herein and disclosed herein; for example, the RI of the diffuser polymer particles can be from a lower limit of 1.4, 1.51, 1.52, 1.53 or 1.54 to an upper limit of 1.51, 1.52, 1.53, 1.60, or 1.70. For example, the RI of the diffuser polymer particles may be in the range of from 1.4 to 1.70, or in the alternative, the RI of the diffuser polymer particles may be in the range of from 1.43 to 1.65, or in the alternative, the RI of the diffuser polymer particles may be in the range of from 1.45 to 1.60, or in the alternative, the RI of the diffuser polymer particles may be in the range of from 1.45 to 1.55, or in the alternative, the RI of the diffuser polymer particles may be in the range of from 1.5 to 1.7, or in the alternative, the RI of the diffuser polymer particles may be in the range of from 1.40 to 1.46, or in the alternative, the RI of the diffuser polymer particles may be in the range of from 1.40 to 1.55, or in the alternative, the RI of the diffuser polymer particles may be in the range of from 1.60 to 1.7.

The diffuser polymer particles are characterized by a crosslinking level greater than 4 wt %. All individual values and subranges from greater than 4 wt % are included herein and disclosed herein; for example, the crosslinking level of the diffuser polymer particles can be from a lower limit of 4, 5, 6, 7, 8, 10, 12, or 14 wt %.

The diffuser polymer particles are produced using at least one alkyl(meth)acrylate monomer copolymerized with from 5 wt % to 25 wt % crosslinking monomer selected from the group consisting of aliphatic crosslinking monomers, aromatic crosslinking monomers and combinations thereof.

In an alternative embodiment, the instant invention provides a light diffusing composition, method of producing the same, articles made therefrom, and method of making such articles, in accordance with any of the preceding embodiments, except that diffuser polymer particles are made using any one or more alkyl(meth)acrylate monomer.

In a particular embodiment, the diffuser polymer particles are produced using $C_2$-$C_8$ acrylate monomers. For example, the diffuser polymer particles may be produced using ethyl acrylate, ethylhexyl acrylate, propyl acrylate, butyl acrylate monomers, isooctylacrylate or any combination thereof.

In an alternative embodiment, the diffuser polymer particles are produced using $C_1$-$C_8$ methacrylate monomers. For example, the diffuser polymer particles may be produced using methyl methacrylate, ethyl methacrylate, hydroxyethyl methacrylate, cyclohexyl methacrylate, butyl methacrylate monomers or any combination thereof.

In an alternative embodiment, the instant invention provides a light diffusing composition, method of producing the same, articles made therefrom, and method of making such articles, in accordance with any of the preceding embodiments, except that diffuser polymer particles are made using methyl methacrylate.

In an alternative embodiment, the instant invention provides a light diffusing composition, method of producing the same, articles made therefrom, and method of making such articles, in accordance with any of the preceding embodiments, except that diffuser polymer particles are made using methyl methacrylate copolymerized with divinylbenzene.

In an alternative embodiment, the instant invention provides a light diffusing composition, method of producing the same, articles made therefrom, and method of making such articles, in accordance with any of the preceding embodiments, except that diffuser polymer particles are made using any one or more aryl(meth)acrylate monomers. Exemplary aryl(meth)acrylates include substituted and unsubstituted phenyl(meth)acrylates such as phenyl methacrylate and naphthyl methacrylate and substituted and unsubstituted benzyl(meth)acrylates such as benzyl methacrylate and benzyl acrylate.

In an alternative embodiment, the instant invention provides a light diffusing composition, method of producing the same, articles made therefrom, and method of making such articles, in accordance with any of the preceding embodiments, except that diffuser polymer particles are made using any two or more alkyl(meth)acrylate monomers. For example, the diffuser polymer particles may be made using butyl acrylate and methyl methacrylate monomers, or in the alternative, the diffuser polymer particles may be made using butyl methacrylate and methyl methacrylate monomers.

In an alternative embodiment, the instant invention provides a light diffusing composition, method of producing the same, articles made therefrom, and method of making such articles, in accordance with any of the preceding embodiments, except that diffuser polymer particles are made by copolymerizing the one or more alkyl(meth)acrylate monomer copolymerized with from 5 wt % to 25 wt % crosslinking monomer selected from the group consisting of aliphatic crosslinking monomers, aromatic crosslinking monomers and combinations thereof. All individual values and subranges from 5 wt % to 25 wt % crosslinking monomer are included herein and disclosed herein; for example, the amount of crosslinking monomer can be from a lower limit of 5, 8, 11.5, 14, 17.7, 21 or 24 wt % to an upper limit 6, 9.2, 12, 15.6, 18, 23.5 or 25 wt %. For example, the amount of crosslinking monomer may be in the range of from 5 to 25 wt %, or in the alternative, the amount of crosslinking monomer may be in the range of from 5 to 15 wt %, or in the alternative, the amount of crosslinking monomer may be in the range of from 15 to 55 wt %, or in the alternative, the amount of crosslinking monomer may be in the range of from 7.5 to 18 wt %, or in the alternative, the amount of crosslinking monomer may be in the range of from 9 to 23 wt %, Any, or any combination of, aliphatic crosslinking monomers and aromatic crosslinking monomer(s) suitable for copolymerization with the one or more alkyl(meth)acrylate monomers, may be used. For example, the crosslinking monomer(s) may be selected from the group consisting of divinylbenzene, trivinylbenzene, diallylphthalate, allyl methacrylate, butanediol di(meth)acrylate, ethyleneglycol di(meth)acrylate, diethyleneglycol di(meth)acrylate, trimethylolpropane tri(meth)acrylate, divinylsulfone and combinations thereof.

The diffuser polymer particles may optionally, be produced by copolymerizing the one or more alkyl(meth)acrylate monomers and crosslinking monomer(s) with one or more comonomers selected from the group consisting of aryl(meth)acrylate monomers and monovinyl arenes.

Aryl(meth)acrylates useful for optionally copolymerizing with the one or more alkyl(meth)acrylate monomers and crosslinking monomer include, for example, phenyl methacrylate, phenylethyl methacrylates, phenylpropyl methacrylates; arylalkyl methacrylates, in which the aryl group is substituted with alkyl groups, halogen atoms, alkoxy groups, nitro groups, or similar substituents which will not interfere with the polymerization reaction, aryloxyalkyl; (meth)acrylates, such as phenoxyethyl methacrylates, and benzyloxyethyl methacrylates and benzyl(meth)acrylates in which the aryl group is substituted or unsubstituted.

Monovinyl arenes contain from 8 to about 16 carbon atoms per molecule. These compounds can carry no other substituent on the aromatic nucleus than the vinyl substituent or they can be additionally substituted on the aromatic nucleus by alkyl, cycolalkyl, aryl, halogen, alkylaryl and arylalkyl radicals. Exemplary monovinyl arenes useful for optionally copolymerizing with the one or more alkyl(meth)acrylate monomers and crosslinking monomer(s) include styrene, 3-methylstyrene, 4-propylstyrene, 1-vinylnaphthalene, 4-cyclohexylstyrene, p-tolylstyrene, p-benzylstyrene, 1-vinyl-5-butylnaphthalene, bromostyrene, chlorostyrene.

In an alternative embodiment, the instant invention provides a composition, method of producing the same, articles made therefrom, and method of making such articles, in accordance with any of the preceding embodiments, except that the diffuser polymer particles are produced by copolymerizing one or more alkyl(meth)acrylate monomers and divinylbenzene with methyl methacrylate.

In an alternative embodiment, the instant invention provides a composition, method of producing the same, articles made therefrom, and method of making such articles, in accordance with any of the preceding embodiments, except that the diffuser polymer particles are produced in the absence of aryl(meth)acrylate monomers and/or monovinyl arenes.

In an alternative embodiment, the instant invention provides a composition, method of producing the same, articles made therefrom, and method of making such articles, in accordance with any of the preceding embodiments, except that the diffuser polymeric particles comprise from 50 to 90 wt % units derived from at least one alkyl(meth)acrylate monomer, from 5 to 25 wt % units derived from one or more aryl(meth)acrylate comonomers, and from 5 to 25 wt % crosslinking monomer selected from the group consisting of aliphatic crosslinking monomers, aromatic crosslinking monomers and combinations thereof.

All individual values and subranges from 50 to 90 wt % units derived from one or more alkyl(meth)acrylate comonomers are included herein and disclosed herein; for example, the amount of units derived from alkyl methacrylate comonomers can be from a lower limit of 50, 55, 60, 65, 72, 78, 84, 88, or 89 wt % to an upper limit of 52, 59, 64, 70, 78, 85, 89 or 90 wt %. For example, the amount of units derived from alkyl methacrylate comonomers may be in the range of from 50 to 90 wt %, or in the alternative, the amount of units derived from alkyl methacrylate comonomers may be in the range of from 50 to 70 wt %, or in the alternative, the amount of units derived from alkyl methacrylate comonomers may be in the range of from 60 to 90 wt %, or in the alternative, the amount of units derived from alkyl methacrylate comonomers may be in the range of from 63 to 87 wt %, or in the alternative, the amount of units derived from alkyl methacrylate comonomers may be in the range of from 52 to 78 wt %.

All individual values and subranges from 5 to 25 wt % units derived from one or more aryl(meth)acrylate comonomers are included herein and disclosed herein; for example, the amount of units derived from one or more aryl(meth) acrylate comonomers can be from a lower limit of 5, 8, 11, 14, 17, 20, 23 or 24 wt % to an upper limit of 6, 9, 12, 15, 18, 21, 24 or 25 wt %. For example, the amount of units derived from one or more aryl(meth)acrylate comonomers may be in the range of from 5 to 25 wt %, or in the alternative, the amount of units derived from aryl(meth) acrylate comonomers may be in the range of from 50 to 15 wt %, or in the alternative, the amount of units derived from aryl(meth)acrylate comonomers may be in the range of from 15 to 27 wt %, or in the alternative, the amount of units derived from aryl(meth)acrylate comonomers may be in the range of from 12 to 20 wt %, or in the alternative, the amount of units derived from aryl(meth)acrylate comonomers may be in the range of from 14 to 22 wt %.

All individual values and subranges from 5 to 25 wt % units derived from one or more crosslinking monomer are included herein and disclosed herein; for example, the amount of units derived from one or more crosslinking monomer can be from a lower limit of 5, 8, 11, 14, 17, 20, 23 or 24 wt % to an upper limit of 6, 9, 12, 15, 18, 21, 24 or 25 wt %. For example, the amount of units derived from one or more crosslinking monomer may be in the range of from 5 to 25 wt %, or in the alternative, the amount of units derived from crosslinking comonomers may be in the range of from 50 to 15 wt %, or in the alternative, the amount of units derived from crosslinking comonomers may be in the range of from 15 to 27 wt %, or in the alternative, the amount of units derived from crosslinking comonomers may be in the range of from 12 to 20 wt %, or in the alternative, the amount of units derived from crosslinking comonomers may be in the range of from 14 to 22 wt %.

In an alternative embodiment, the instant invention provides a composition, method of producing the same, articles made therefrom, and method of making such articles, in accordance with any of the preceding embodiments, except that the diffuser polymer particles are produced via suspension polymerization, emulsion polymerization, dispersion polymerization or miniemulsion polymerization.

The diffuser polymer particles include from 0.1 to 20 wt % one or more performance additives dispersed within the diffuser polymer particles based on the total weight of the diffuser particle, including the performance additive, or is it based on the weight of the diffuser particle absent the performance additive. As used herein, the term "performance additive" means non polymerizable materials that are dissolved or dispersed in the monomer prior to polymerization to form, after polymerization, a polymer diffuser particle containing one or more performance additives. Performance enhancing additives include refractive index changing agents, flame retardants, pigments, dyes and other additives capable of altering the chemical and/or physical properties of the polymer diffuser particle.

All individual values and subranges from 0.1 to 20 wt % one or more performance additives are included herein and disclosed herein; for example, the amount of one or more performance additive dispersed in the diffuser polymeric particles may be from a lower limit of 0.1, 1, 5, 6.6, 10, 13.3, 15, 17.8, or 19.5 wt % to an upper limit of 1.2, 9.9, 12.5, 14.9, 17.9 or 20 wt %. For example, the amount of one or more performance additives in the diffuser polymer particles may be in the range of from 0.1 to 20 wt %, or in the alternative, the amount of one or more performance additives may be in the range from 0.5 to 10 wt %, or in the alternative, the amount of one or more performance additives may be in the range from 1 to 5 wt %, or in the alternative, the amount of one or more performance additives may be in the range from 0.75 to 7.5 wt %, or in the alternative, the amount of one or more performance additives may be in the range from 0.5 to 5 wt %.

Performance enhancing additives include refractive index changing agents, flame retardants, pigments, dyes and other additives capable of altering the chemical and/or physical properties of the polymer diffuser particle.

In an alternative embodiment, the instant invention provides a composition, method of producing the same, articles made therefrom, and method of making such articles, in accordance with any of the preceding embodiments, except that the performance additive is one or more refractive index changing agents. Refractive index changing additives are those additives that have a different refractive index than the polymer produced by the polymerization of the polymerizable monomers. Refractive index changing additives include but are not limited to diphenyl sulfone (RI=1.587), diphenyl ether (RI=1.579), diphenyl sulfide (RI=1.633), polystyrene (RI=1.589), TiO2 (RI=2.609), diphenyl disulfide (RI=1.630), polydimethyl siloxane (RI=1.404).

In an alternative embodiment, the instant invention provides a composition, method of producing the same, articles made therefrom, and method of making such articles, in accordance with any of the preceding embodiments, except that the performance additive is a pigment. As used herein, the term "pigment" includes any type of compound which imparts color or opacity, and includes pigments, dyes, colorants and fillers, provided such pigments meet the definition of performance additive provided herein.

In an alternative embodiment, the instant invention provides a composition, method of producing the same, articles made therefrom, and method of making such articles, in accordance with any of the preceding embodiments, except that the composition comprises X amount of pigment dispersed in the diffuser particles and exhibits a ΔE of at least 0.5 when compared with a comparative composition having identical components as the composition except that the X amount of the pigment is dispersed in the matrix polymer and not in the diffuser particles. ΔE is a measure of color difference and is calculated using the formula (1)

$$\Delta E = \{[L_{(1)} - L_{(2)}]^2 + [a_{(1)} - a_{(2)}]^2 [b_{(1)} - b_{(2)}]^2\}^{1/2} \quad (1)$$

wherein L, a and b are measured on test plaques of 70 mm×70 mm×1.5 mm using a hand held BYK Gardner Color-guide Sphere. The ΔE is calculated between the plaque (1) with diffusers incorporated with pigment during emulsion polymerization process and the plaque (2) with the same level pigment dispersed in the matrix polymer and diffuser particles which do not contain any pigment. All individual values and subranges of at least 0.5 are included herein and disclosed herein; for example, the ΔE may be from a lower limit of 0.5, 1.25, 1.6, 1.89, 2.4, 2.93, 3.5, 4, 2.87, 5.0, 5.73, 6.1, or 6.8.

In an alternative embodiment, the instant invention provides a composition, method of producing the same, articles made therefrom, and method of making such articles, in accordance with any of the preceding embodiments, except that the composition comprises Y amount of $TiO_2$ in the diffuser particles exhibits an increase of at least 50% in D50 angle in comparison to a comparative composition having an identical components as the composition except that the Y amount of the $TiO_2$ is dispersed in the matrix polymer and not in the diffuser particles. All individual values and subranges of an increase of at least 50% in D50 angle are included herein and disclosed herein; for example, the increase in D50 angle may be from a lower limit of 50%, 52%, 55%, 57%, 60%, or 65%.

In an alternative embodiment, the instant invention provides a composition, method of producing the same, articles made therefrom, and method of making such articles, in accordance with any of the preceding embodiments, except that the performance additive is one or more flame retardants. In particular embodiments, the one or more flame retardants are non-halogenated. The non halogenated flame retardant is selected from the group consisting of aryl phosphates and alkylphosphates, diphosphates, phosphonates, aryl sulfonates and alkyl sulfonates.

In an alternative embodiment, the one or more flame retardants are selected from the group consisting of bromine-containing acrylic polymer resins (such as, brominated polybenzyl(meth)acrylate resin), bromine-containing styrene polymer resins (such as, bromination product of a styrene resin, brominated styrene resin such as a homo- or co-polymer of brominated styrene monomers, etc.), bromine-containing polycarbonate resins (such as, brominated bisphenol-type polycarbonate resin), bromine-containing epoxy compound (such as, brominated bisphenol-type epoxy resin, brominated bisphenol-type phenoxy resin), brominated polyaryl ether compounds, brominated aromatic imide compounds (such as, alkylene-bis-brominated phthalimide), brominated bisaryl compounds, brominated tri(aryloxy)triazine compounds, and combinations thereof.

In an alternative embodiment, the instant invention provides a composition, method of producing the same, articles made therefrom, and method of making such articles, in accordance with any of the preceding embodiments, except that the matrix polymer comprises polycarbonate and wherein a plaque tested according to ASTM D2863-12 exhibits an LOI of at least 24%. All individual values and subranges of at least 24% LOI are included herein and disclosed herein. For example, the plaque may exhibit an LOI of at least 24%, or in the alternative the LOI may be at least 25%, or in the alternative the LOI may be at least 25.7%, or in the alternative the LOI may be at least 26.2%, or in the alternative the LOI may be at least 26.7%, or in the alternative the LOI may be at least 27.2%, or in the alternative the LOI may be at least 27.7%, or in the alternative the LOI may be at least 28%.

In an alternative embodiment, the instant invention provides a composition, method of producing the same, articles made therefrom, and method of making such articles, in accordance with any of the preceding embodiments, except that the performance additive is a refractive index changing agent.

In an alternative embodiment, the instant invention provides a composition, method of producing the same, articles made therefrom, and method of making such articles, in accordance with any of the preceding embodiments, except that the performance additive is a refractive index changing agent that changes the refractive index by greater than 0.01 units. All individual values and subranges from greater than 0.01 units are included herein and disclosed herein; for example, the change in refractive index may be from a lower limit of 0.01, 0.02, 0.03, 0.04, 0.05, or 0.06 units. In one embodiment, the change is up to a maximum of 0.1 units. In an alternative embodiment, the refractive index change can have a maximum of 0.04 units, or in the alternative, the refractive index change can have a maximum of 0.05 units, or in the alternative, the refractive index change can have a maximum of 0.06 units.

In an alternative embodiment, the instant invention provides a composition, method of producing the same, articles made therefrom, and method of making such articles, in accordance with any of the preceding embodiments, except that the blended product is prepared by dry blending to produce a dry blended product.

In an alternative embodiment, the instant invention provides a composition, method of producing the same, articles made therefrom, and method of making such articles, in accordance with any of the preceding embodiments, except that the dry blended product is further melt compounded and processed via extrusion, injection molding, blow molding, calendaring, or milling.

In an alternative embodiment, the present invention provides articles comprising the light diffusing composition in accordance with any of the preceding embodiments. Exemplary articles include light diffusers, lighting fixture components, light bulb components, panels used to cover lighting fixtures, skylights, luminaires, rear projection screens for television or film viewing, decoration, illuminated signs (especially back-lit translucent signs), greenhouse glazing, light boxes, drafting tables, automotive sunroofs, artistic applications (e.g., as visual display-case components), antiglow screens for CRT units, twin-wall glazing, LED display covers, control panels, automotive components (such as covers for automotive lights and control panels), and aircraft components (such as control panel covers). As used herein, the term "lighting diffuser" means any such article which diffuses the light emitted by an LED or other alternative sources.

In another embodiment, the invention provides a composition consisting essentially of: a blended product of: a matrix polymer; and from 0.05 to 2.5 wt % diffuser polymer particles, wherein the diffuser polymer particles are characterized by an average diameter from 2 to 20 micrometers, a particle size distribution such that at least 90 wt % of the polymer particles fall within ±30% of the volume average particle size, a crosslinking level greater than 4%; and wherein the diffuser polymer particles comprise units derived from at least one alkyl(meth)acrylate monomer, from 5 wt % to 25 wt % units derived from a crosslinking monomer selected from the group consisting of aliphatic crosslinking monomers, aromatic crosslinking monomers and combinations thereof, optionally, units derived from one or more comonomers selected from the group consisting of aryl(meth)acrylate monomers and monovinyl arenes; and wherein from 0.1 to 20 wt % one or more performance additives are dispersed within the diffuser polymer particles.

In another embodiment, the invention provides a composition comprising: a blended product of: a matrix polymer; and from 0.05 to 2.5 wt % diffuser polymer particles, wherein the diffuser polymer particles are characterized by an average diameter from 2 to 20 micrometers, a particle size distribution such that at least 90 wt % of the polymer particles fall within ±30% of the volume average particle size, a crosslinking level greater than 4%; and wherein the diffuser polymer particles consist essentially of units derived from at least one alkyl(meth)acrylate monomer, from 5 wt % to 25 wt % units derived from a crosslinking monomer selected from the group consisting of aliphatic crosslinking monomers, aromatic crosslinking monomers and combinations thereof, optionally, units derived from one or more comonomers selected from the group consisting of aryl (meth)acrylate monomers and monovinyl arenes; and wherein from 0.1 to 20 wt % one or more performance additives are dispersed within the diffuser polymer particles.

In yet another embodiment, the instant invention provides a method of producing the light diffusing composition consisting essentially of copolymerizing at least one alkyl (meth)acrylate monomer copolymerized with from 5 wt % to 25 wt % crosslinking monomer selected from the group consisting of aliphatic crosslinking monomer, aromatic crosslinking monomer and combinations thereof in the presence of one or more performance additives to form diffuser polymer particles; and blending the diffuser polymer particles into a matrix polymer (which are subsequently melt processed) wherein the diffuser polymer particles are present in the composition at a level from 0.05 to 2.5 wt % based on the weight of the matrix polymer plus the weight of the diffuser polymer particle; wherein the copolymerization process to produce the light diffusing particle is selected from the group consisting of suspension polymerization, emulsion polymerization, or a combination thereof; and wherein the performance additives are non-polymerizable in the copolymerization process such that the performance additives are dispersed in the diffuser polymer particles.

In another embodiment, the instant invention provides articles consisting essentially of the light diffusing composition according to any of the foregoing embodiments.

EXAMPLES

The following inventive examples illustrate the present invention but are not intended to limit the scope of the invention.

PREPARATION OF DIFFUSER POLYMER PARTICLE EXAMPLES

Example 1: Preparation of Diffuser Polymer Particle Example 1

Step 1:

In Step 1, crosslinked polymer particles having a 0.25µ diameter are produced. The components of the reaction are shown in Table 1.

A reactor equipped with stirrer and condenser and blanked with nitrogen was charged with Mixture A (see Table 1) and heated to 83° C. 10 wt % of homogenized Mixture B (see Table 1) and 25% of Mixture C (see Table 1) were then added into the reactor with stirring. The mixture was stirred for 60 minutes while maintaining the mixture at 83° C. The remaining Mixture B and Mixture C were added to the reactor with stirring at 83° C. over a period of 120 minutes. Stirring was continued at 83° C. for 90 minutes, after which the reactor contents were cooled to room temperature (about 21° C.). The particle size of the resulting particles was 0.25 µm as measured by a Brookhaven Instruments particle size analyzer BI-90. "DI Water" means deionized water.

TABLE 1

| Mixture | Component | Parts by Weight |
|---------|-----------|-----------------|
| A | DI Water | 180 |
|   | Sodium Carbonate | 0.40 |
| B | N-Butyl Acrylate | 98.0 |
|   | Allyl Methacrylate | 1.75 |
|   | 1,4-Butanediol Diacrylate | 0.25 |
|   | 22.5% aqueous Sodium Dodecylbenzenesulfonate | 2.22 |
|   | DI Water | 40.8 |
| C | Sodium Persulfate | 0.06 |
|   | DI water | 11.9 |

Step 2:

In this step, the particles created in STEP 1 are grown to 0.75µ diameter using an emulsion of n-butyl acrylate, styrene, and 1-hexanethiol. The components of the reaction are shown in Table 2.

Into a reactor equipped with stirrer and condenser and blanked with nitrogen, Mixture A was added and heated to 85° C. with stirring. Mixtures B, C, D and E (see Table 2) were added, with stirring, to the reactor over a period of 4 hours, after which the temperature was maintained at 86° C. with stirring for 60 minutes. The reactor contents were then cooled to 70° C., Mixtures F and G (see Table 2) were added, and the reactor contents were maintained at 70° C. with stirring for 1.5 hour. After which the reactor contents were cooled to room temperature. The resulting emulsion polymer particles had a diameter of 0.75µ, as measured by a Brookhaven Instruments particle size analyzer BI-90.

TABLE 2

| Mixture | Component | Parts by Weight |
|---------|-----------|-----------------|
| A | DI Water | 156 |
|   | Sodium Carbonate | 0.07 |
| B | DI Water | 1.85 |
|   | 30.10% aqueous emulsion from STEP 1 | 23.78 |
| C | n-Butyl Acrylate | 64.20 |
|   | Styrene | 14.11 |
|   | 9.76% aqueous Sodium | 0.87 |

TABLE 2-continued

| Mixture | Component | Parts by Weight |
|---|---|---|
| | Dodecylbenzenesulfonate | |
| | DI Water | 26.13 |
| D | 1-Hexanethiol | 14.70 |
| | 9.76% aqueous Sodium Dodecylbenzensulfonate | 1.19 |
| | DI Water | 11.94 |
| E | Potassium Persulfate | 0.08 |
| | DI Water | 4.63 |
| F | t-Butyl Hydroperoxide 70% | 0.24 |
| | DI Water | 3.33 |
| G | Sodium Formaldehyde sulfoxylate | 0.16 |
| | DI Water | 6.61 |

Example 2: Preparation of Diffuser Polymer Particle Example 2

The polymer particles produced in the emulsion of Example 1 are grown to 3.10μ diameter using an emulsion of butyl methacrylate, styrene, and allyl methacrylate. The components of the reaction are shown in Table 3 and yield a polymer particle of refractive index equal to 1.501.

A reactor equipped with stirrer and condenser and blanked with nitrogen was charged with Mixture A (see Table 3), and heated to 80° C. with stirring. Homogenized mixture B (see Table 3) was added, with stirring, to the reactor, after which the temperature was maintained at 80° C. Following addition of mixture B, the reactor was stirred for 180 minutes. Mixture C (see Table 3) was then charged into the reactor, and the reactor contents maintained at 70° C., while an exothermic polymerization took place. After the reactor contents reached peak temperature, the reactor contents were maintained at 85° C. with stirring for 150 minutes. The reactor contents were then cooled to ambient temperature. The resulting emulsion particles had a diameter of 3.10μ as measured by a Malvern particle size analyzer. EGDMA means ethylene glycol dimethacrylate and TMPTMA means trimethylolpropane triacrylate. TRIGONOX 21 S is tert-butyl peroxy-2-ethylhexanoate, commercially available from Akzo Nobel Corporation.

TABLE 3

| Mixture | Component | Parts by Weight |
|---|---|---|
| A | DI Water | 200 |
| | Sodium Nitrite | 0.03 |
| | Aqueous emulsion from Example 1 (33.78% solids) | 2.38 |
| B | Butyl Methacrylate | 70 |
| | Ally Methacrylate | 8.00 |
| | Styrene | 15 |
| | EGDMA | 0.12 |
| | TMPTMA | 7.00 |
| | 10% aqueous Sodium Dodecylbenzensulfonate | 7.00 |
| | DI Water | 125 |
| C | 10% aqueous Sodium Dodecylbenzensulfonate | 1.00 |
| | DI Water | 20 |
| | TRIGONOX 21S | 0.60 |

Example 3: Preparation of Diffuser Polymer Example 3

The polymer particles produced in the emulsion of Example 1 are grown to 4.60μ, diameter using an emulsion of methyl methacrylate and divinyl benzene. The components of the reaction are shown in Table 4 and yield a polymer particle with a refractive index of 1.518.

A reactor equipped with stirrer and condenser and blanked with nitrogen was charged with Mixture A (see Table 4) at room temperature and the mixture was stirred overnight. Mixture B (see Table 4) to the reactor, and charged homogenized Mixture C (see Table 4) into the reactor. The reactor contents were heated to 65° C., and maintained at that temperature for 330 minutes. The temperature was then raised to 75° C., and held at that temperature for 120 minutes. The temperature was then raised to 85° C. and held at that temperature for 180 minutes. The reactor contents were then cooled to ambient temperature. The resulting emulsion particles had a diameter of 4.6μ as measured by a Malvern particle size analyzer.

TABLE 4

| Mixture | Component | Parts by Weight |
|---|---|---|
| A | DI Water | 240 |
| | Sodium nitrite | 0.015 |
| | PVP | 10 |
| B | Aqueous emulsion from Step 2 (33.78% solids) | 0.823 |
| C | MMA | 76.8 |
| | DVB | 23.2 |
| | 10% Aqueous sodium dodecylbenzenesulfonate | 8.0 |
| D | DI Water | 50 |
| | Benzoyl peroxide | 0.6 |

Example 4: Preparation of Diffuser Polymer Particle Example 4

The polymer particles produced in the emulsion of Example 1 are grown to 4.60μ, diameter using an emulsion of methyl methacrylate and divinyl benzene. The components of the reaction are shown in Table 5 and yield a polymer particle diffuser containing a pigment. A reactor equipped with stirrer and condenser and blanked with nitrogen was charged with Mixture A (see Table 5) at room temperature and the mixture was stirred overnight. Mixture B (see Table 5) to the reactor, and charged homogenized Mixture C (see Table 5) into the reactor. The reactor contents were heated to 65° C., and maintained at that temperature for 330 minutes. The temperature was then raised to 75° C., and held at that temperature for 120 minutes. The temperature was then raised to 85° C. and held at that temperature for 180 minutes. The reactor contents were then cooled to ambient temperature. The resulting emulsion particles had a diameter of 4.6μ as measured by a Malvern particle size analyzer. QUINOLINE YELLOW SS is a pigment which is commercially available from Sigma-Aldrich Co. LLC

TABLE 5

| Mixture | Component | Parts by weight |
|---|---|---|
| A | DI Water | 240 |
| | Sodium nitrite | 0.015 |
| | PVP | 10 |
| B | Aqueous emulsion from Example 1 (33.78% solids) | 0.823 |
| C | MMA | 76.8 |
| | DVB | 23.2 |
| | QUINOLINE YELLOW SS | 0.0384 |
| | 10% Aqueous sodium dodecylbenzenesulfonate | 8.0 |

TABLE 5-continued

| Mixture | Component | Parts by weight |
|---|---|---|
| D | DI Water | 50 |
|  | Benzoyl peroxide | 0.6 |

Example 5: Preparation of Diffuser Polymer Particle Example 5

The polymer particles produced in the emulsion of Example 1 are grown to 3.60μ diameter using an emulsion of methyl methacrylate and divinyl benzene. The components of the reaction are shown in Table 6. MMA means methyl methacrylate, PVP means polyvinyl pyrolidone and DVB means divinylbenzene.

A reactor equipped with stirrer and condenser and blanked with nitrogen was charged with Mixture A (see Table 6) at room temperature and stirred overnight. Then Mixture B (see Table 6) was added to the reactor and the temperature was raised to 80° C. Homogenized Mixture C (see Table 6) was charged into the reactor, and the mixture was stirred for 60 minutes while the temperature was maintained at 80° C. The reactor contents temperature was then cooled to 65° C. Mixture D (see Table 6) was charged into the reactor and the temperature maintained at 65° C. while an exothermic polymerization took place. After the peak temperature was reached, the reactor contents were maintained at 80° C. with stirring for 30 minutes. The reactor contents temperature were then raised to 87° C. and held at that temperature for 165 minutes before cooling the reactor contents to ambient temperature. The resulting emulsion particles had a diameter of 3.6μ as measured by a Malvern particle size analyzer.

TABLE 6

| Mixture | Component | Parts by Weight |
|---|---|---|
| A | DI Water | 250 |
|  | Sodium nitrite | 0.015 |
|  | PVP | 8.0 |
| B | Aqueous emulsion from Example 1 (33.78% solids) | 2.49 |
| C | MMA | 76.8 |
|  | DVB | 23.2 |
|  | 10% aqueous Sodium dodecylbenzenesulfonate | 8.0 |
|  | DI Water | 90 |
| D | Benzoyl peroxide | 0.6 |
|  | MMA | 3.0 |

Example 6: Preparation of Diffuser Polymer Particle Example 6

The polymer particles produced in the emulsion of Example 1 are grown to 3.7 μm diameter using an emulsion of Butyl Methacrylate (BMA), Methyl methacrylate, diphenyl sulfone (DPS), allyl methacrylate (ALMA) and Divinyl Benzene. The components of the reactions are shown in Table 7 and yield a polymer particle diffuser with a refractive index of 1.518.

A reactor equipped with a stirrer and a condenser and blanked with nitrogen was charged with Mixture A (see Table 7) at room temperature (about 21° C.) and stirred overnight. Then to the reactor contents was added Mixture B (see Table 7), and the temperature was raised to 80° C. Homogenized Mixture C (see Table 7) was then charged into the reactor, and the mixture was stirred for 60 minutes while the temperature was maintained at 80° C. The temperature of the reactor content was then cooled to 65° C., and Mixture D (see Table 7) then added into the reactor with the reactor contents maintained at 65° C., while an exothermic polymerization took place. After peak temperature was reached, the reactor contents were then kept at 80° C. with stirring for 30 minutes. The temperature of the reactor contents was then raised to 87° C. and held at that temperature for 165 minutes before cooling the reactor contents to ambient temperature (about 21° C.). The resulting emulsion particles had a diameter of 3.7 μm as measured by a Malvern particle size analyzer.

TABLE 7

| Mixture | Component | Parts by weight |
|---|---|---|
| A | DI Water | 250 |
|  | Sodium nitrite | 0.015 |
|  | PVP | 8.0 |
| B | Aqueous emulsion from Example 1 (33.78% solids) | 2.49 |
| C | MMA | 58.0 |
|  | BMA | 10.0 |
|  | DPS | 8.0 |
|  | ALMA | 10.0 |
|  | DVB | 14.0 |
|  | 10% Aqueous sodium dodecylbenzenesulfonate | 8.0 |
| D | DI Water | 90 |
|  | Benzoyl peroxide | 0.6 |
|  | MMA | 3.0 |

Example 7: Preparation of Diffuser Polymer Particle Example 7

The polymer particles produced in the emulsion of STEP 2 are grown to 2.60 μm diameter using an emulsion of butyl methacrylate, styrene, allyl methacrylate and a brominated polystyrene flame retardant (SAYTEX HP-3010). The components of the reactions are shown in Table 8 and yield a polymer particle diffuser containing a flame retardant.

A reactor equipped with a stirrer and a condenser and blanked with nitrogen was charged with Mixture A (see Table 8), and heated to 80° C. with stirring. Homogenized Mixture B (see Table 8) was then added, with stirring, to the reactor, after which the temperature was maintained at 80° C. with stirring for 180 minutes. Mixture C (see Table 8) was then charged into the reactor while the reactor contents were maintained 70° C., while an exothermic polymerization took place. After peak temperature was reached, the reactor contents were maintained at 85° C. with stirring for 150 minutes. The reactor contents were then cooled to ambient temperature (about 21° C.). The resulting emulsion particles had a diameter of 2.6 μm as measured by a Malvern particle size analyzer. TMPTMA means trimethylolpropane triacrylate. TRIGONOX 21S is tert-butyl peroxy-2-ethylhexanoate, commercially available from Akzo Nobel Corporation. SAYTEX HP-3010 is a brominated polystyrene, commercially available from Albemarle Corporation.

TABLE 8

| Mixture | Component | Parts by Weight |
|---|---|---|
| A | DI Water | 200 |
|  | Sodium Nitrite | 0.015 |
|  | Aqueous emulsion from Example 1 (32.54% solids) | 2.38 |

TABLE 8-continued

| Mixture | Component | Parts by Weight |
|---|---|---|
| B | Butyl Methacrylate | 61 |
|   | Allyl Methacrylate | 11.00 |
|   | Styrene | 15 |
|   | SAYTEX HP-3010 | 8 |
|   | TMPTMA | 5.00 |
|   | 10% aqueous Sodium Dodecylbenzensulfonate | 7.00 |
| C | DI Water | 125 |
|   | 10% aqueous Sodium Dodecylbenzensulfonate | 1.00 |
|   | DI Water | 20 |
|   | TRIGONOX 21S | 0.60 |

Example 8: Preparation of Diffuser Polymer Particle Example 8

The polymer particles produced in the emulsion of Example 1 are grown to 4.15 μm diameter using an emulsion of Butyl Methacrylate, Styrene, allyl methacrylate and a flame retardant Saytex HP-3010. Components of the reaction are shown in Table 9 and yield a polymer particle diffuser containing a flame retardant A reactor equipped with stirrer and condenser and blanked with nitrogen was charged with Mixture A, and heated to 80° C. with stirring. Homogenized Mixture B was added, with stirring, to the reactor, after which the temperature was maintained at 80° C. with stirring for 180 minutes. Charge Mixture C into the reactor, kept the content in the reactor at 70° C., while an exothermic polymerization took place. After reached peak temperature, kept the content in the reactor at 85° C. with stirring for 150 minutes. After which the reactor contents were cooled to ambient temperature. The resulting emulsion particles had a diameter of 4.15 μm as measured by a Malvern particle size analyzer. TMPTMA means trimethylolpropane triacrylate. TRIGONOX 21 S is tert-butyl peroxy-2-ethylhexanoate, commercially available from Akzo Nobel Corporation. SAYTEX CP-2000 is a tetrabromobisphenol A based flame retardant, commercially available from Albemarle Corporation.

TABLE 9

| Mixture | Component | Parts by Weight |
|---|---|---|
| A | DI Water | 200 |
|   | Sodium Nitrite | 0.015 |
|   | Aqueous emulsion from Example 1 (32.54% solids) | 2.38 |
| B | Butyl Methacrylate | 65 |
|   | Allyl Methacrylate | 10.00 |
|   | Styrene | 15 |
|   | SAYTEX CP-2000 | 6.5 |
|   | TMPTMA | 3.5 |
|   | 10% aqueous Sodium Dodecylbenzensulfonate | 7.00 |
| C | DI Water | 125 |
|   | 10% aqueous Sodium Dodecylbenzensulfonate | 1.00 |
|   | DI Water | 20 |
|   | TRIGONOX 21S | 0.60 |

Example 9: Preparation of Diffuser Polymer Particle Example 9

The polymer particles produced in the emulsion of STEP 2 are grown to 3.0 μm diameter using an emulsion of methyl methacrylate, divinyl benzene, and orange dye (MAC-ROLEX ORANGE R). Components of the reaction are shown in Table 10 and yield a diffuser polymer particle containing a dye.

A reactor equipped with a stirrer and a condenser and blanked with nitrogen was charged with Mixture A (see Table 10) at room temperature and stirred overnight. Then to the reactor contents was added Mixture B (see Table 10), and the temperature was raised to 80° C. Homogenized Mixture C (see Table 10) was charged into the reactor, and the mixture was stirred for 60 minutes while the temperature was maintained at 80° C. The temperature of the reactor contents was cooled to 65° C., and Mixture D (see Table 10) then added into the reactor. The reactor contents were then maintained at 65° C., while an exothermic polymerization took place. After the peak temperature was reached, the reactor contents were maintained at 80° C. with stirring for 30 minutes. Subsequently, the temperature was raised to 87° C. and held for 165 minutes at that temperature before cooling the reactor contents to ambient temperature (about 21° C.). The resulting emulsion particles had a diameter of 3.0 μm as measured by a Malvern particle size analyzer. MACROLEX ORANGE R is a methine-based solvent soluble dye which is commercially available from the Lanxess Corporation (Pittsburgh, Pa.).

TABLE 10

| Mixture | Component | Parts by weight |
|---|---|---|
| A | DI Water | 250 |
|   | PVP | 5.0 |
|   | PVOH | 5.0 |
| B | Aqueous emulsion from EXAMPLE 2 at 33.78% solids | 2.49 |
| C | MMA | 76.8 |
|   | DVB | 23.2 |
|   | MACROLEX ORANGE R | 0.5 |
|   | 10% Aqueous sodium dodecylbenzenesulfonate | 8.0 |
|   | DI Water | 90 |
| D | Benzoyl peroxide | 0.6 |
|   | MMA | 3.0 |

Example 10: Preparation of Diffuser Polymer Particle Example 10

The polymer particles produced in the emulsion of Example 1 are grown to 3.0 μm diameter using an emulsion of methyl methacrylate, divinyl benzene, and violet dye (MACROLEX VIOLET 3R). Components of the reaction are given in Table 11 and yield a diffuser polymer particle containing a dye.

The reaction was carried out as described in connection with Example 9 using the components of Table 11. The resulting emulsion particles had a diameter of 3.0 μm as measured by a Malvern particle size analyzer. MACROLEX VIOLET 3R is an anthraquinone-based solvent soluble dye commercially available from the Lanxess Corporation (Pittsburgh, Pa.).

TABLE 11

| Mixture | Component | Parts by weight |
|---|---|---|
| A | DI Water | 250 |
|   | PVP | 5.0 |
|   | PVOH | 5.0 |
| B | Aqueous emulsion from EXAMPLE 1 at 33.78% solids | 2.49 |

TABLE 11-continued

| Mixture | Component | Parts by weight |
|---|---|---|
| C | MMA | 76.8 |
|  | DVB | 23.2 |
|  | MACROLEX VIOLET 3R | 0.5 |
|  | 10% Aqueous sodium dodecylbenzenesulfonate | 8.0 |
|  | DI Water | 90 |
| D | Benzoyl peroxide | 0.6 |
|  | MMA | 3.0 |

Example 11: Preparation of Diffuser Polymer Particle Example 11

The polymer particles produced in the emulsion of Example 1 are grown to 3.0 μm diameter.

The reaction was carried out as described in connection with Example 9 using the components of Table 12. The resulting emulsion particles had a diameter of 3.0 μm as measured by a Malvern particle size analyzer. Ti PURE R-105 is maximum-durability grade of titanium dioxide commercially available from the E. I. du Pont de Nemours and Company.

TABLE 12

| Mixture | Component | Parts by Weight |
|---|---|---|
| A | DI Water | 250 |
|  | PVP | 3.5 |
|  | PVOH | 3.5 |

TABLE 12-continued

| Mixture | Component | Parts by Weight |
|---|---|---|
| B | Aqueous emulsion from Example 1 (32.54% solids) | 2.38 |
|  | DI Water | 125 |
| C | Butyl Acrylate | 64 |
|  | Allyl Methacrylate | 10.00 |
|  | Methyl Methacrylate | 20 |
|  | Ti PURE R-105 | 3.0 |
|  | TMPTMA | 3.0 |
|  | 10% aqueous Sodium Dodecylbenzensulfonate | 7.00 |
| D | DI Water | 20 |
|  | Trigonox 21S | 0.60 |

Preparation of Composition Inventive Examples and Comparative Examples

Exemplary diffuser polymer particles, as shown in Table 13, were dry blended in polycarbonate resin (LEXAN 141, refractive index is 1.590) followed by melt compounding using a 30 mm twin screw extruder (Leistritz, Somerville, N.J.) at barrel temperature ranging from 190 to 288° C. The melt compounding was followed by pelletization, drying at 60° C. in a vacuum oven, and injection molding at temperatures between 250 and 270° C. The dimension of the test plaques from the injection molding were 70 mm×70 mm×1.5 mm. The plaques were evaluated by ASTM E167-96 (Standard practice for Goniophotometry of objects and materials), ASTM D1003-00 (Standard test method for haze and luminous transmittance of transparent plastics) and ASTM E 313-00 (Standard practice for calculation yellowness and whiteness indices from instrumentally measured color coordinates).

TABLE 13

| Composition Ex. # | Diffuser Polymer Particle Ex. # | RI of Diffuser Polymer Particle | PS (μm) | Performance additives (within Diffuser Polymer Particle) Loading Level (%) | TT (%) | D50 (degree) | Haze (%) | YI |
|---|---|---|---|---|---|---|---|---|
| Comparative 1 | 2 | 1.501 | 3.10 | 0 | 83.24 | 20.3 | 102 | 3.73 |
| Inventive 1 | 4 | 1.519 | 4.60 | 0.15 | 87.30 | 15.7 | 101 | 3.34 |
| Comparative 2 | 5 | 1.518 | 3.60 | 0 | 87.20 | 18.7 | 102 | 4.27 |
| Inventive 2 | 6 | 1.518 | 3.60 | 6 | 85.60 | 17.15 | 102 | 7.87 |
| Inventive 3 | 7 | 1.518 | 2.60 | 8 | 81.50 | 20.85 | 102 | 6.25 |
| Inventive 4 | 8 | 1.518 | 4.15 | 6 | 80.55 | 15.6 | 101 | 6.57 |

"RI" indicates refractive index, "PS" indicates particle size, "TT" indicates transmittance and "YI" indicates yellowness index.

Exemplary diffuser polymer particles, as shown in Table 13, were dry blended in polycarbonate resin (LEXAN 141, refractive index is 1.590) followed by melt compounding using a 30 mm twin screw extruder (Leistritz, Somerville, N.J.) at barrel temperature ranging from 190 to 288° C. The melt compounding was followed by pelletization, drying at 60° C. in a vacuum oven, and injection molding at temperatures between 250 and 270° C. The dimension of the test plaques from the injection molding were 70 mm×70 mm×1.5 mm. The plaques were evaluated by ASTM E167-96 (Standard practice for Goniophotometry of objects and materials), ASTM D1003-00 (Standard test method for haze and luminous transmittance of transparent plastics) and ASTM E 313-00 (Standard practice for calculation yellowness and whiteness indices from instrumentally measured color coordinates).

TABLE 14

| Composition Ex. # | Diffuser Polymer Particle Ex. # | Diffuser Polymer Particle Loading (%) | TT (%) | D50 (degree) | Haze (%) |
|---|---|---|---|---|---|
| Inventive 5 | 11 | 0.5 | 67.6 | 21.15 | 102 |
| Inventive 6 | 11 | 1.0 | 56.3 | 48.6 | 103 |
| Comparative 3 | 3 & Ti PURE R-105 (97:3 wt %) | 0.5 | 69.2 | 8.6 | 101 |
| Comparative 4 | 3 & Ti PURE R-105 (97:3 wt %) | 1.0 | 61.9 | 26.85 | 103 |
| Comparative 5 | SI - 020 | 1.0 | 61.32 | 49.8 | 103 |

Comparative Example 5 was produced using commercially available silicone, SI-020, as the diffuser particle. SI-020 is a silicone diffusing agent manufactured and commercially available from Ganz Chemical Co., Ltd and having a particle size of 2μ.

As can be seen from Table 14, diffuser polymer particles in which $TiO_2$ particles are dispersed during emulsion synthesis processing provided higher D50 values than compositions formed by dry powder blending of the $TiO_2$ particles and the diffuser polymer particles into the matrix polymer, at the same $TiO_2$ particle loading level.

Exemplary diffuser polymer particles, as shown in Table 15, were dry blended in polycarbonate resin (LEXAN 141, refractive index is 1.590) followed by melt compounding using a 30 mm twin screw extruder (Leistritz, Somerville, N.J.) at barrel temperature ranging from 190 to 288° C. The melt compounding was followed by pelletization, drying at 60° C. in a vacuum oven, and injection molding at temperatures between 250 and 270° C. The dimension of the test plaques from the injection molding are 70 mm×70 mm×2.5 mm.

TABLE 15

| Composition Example # | Diffuser Polymer Particle Example # | Diffuser Polymer Particle Loading level (%) | Flame Retardant/ Loading Level | LOI (%) |
|---|---|---|---|---|
| Comparative 6 | None | None | none | 24.5 |
| Inventive 7 | 7 | 1% | CP-2000/8% dispersed in diffuser polymer particle | 26.7 |
| Inventive 8 | 8 | 1% | HP-3010/6% dispersed in diffuser polymer particle | 25.3 |

Exemplary diffuser polymer particles, as shown in Table 16, were dry blended in polycarbonate resin (LEXAN 141, refractive index is 1.590) followed by melt compounding using a 30 mm twin screw extruder (Leistritz, Somerville, N.J.) at barrel temperature ranging from 190 to 288° C. The melt compounding was followed by pelletization, drying at 60° C. in a vacuum oven, and injection molding at temperatures between 250 and 270° C. The dimension of the test plaques from the injection molding are 70 mm×70 mm×1.5 mm. The plaques color properties were evaluated with a hand held BYK Gardner Color-guide Sphere. A white porcelain enamel on steel tile from HunterLab was used for backing during the measurement.

TABLE 16

| Composition Ex. # | Diffuser Polymer Particle Example # | L | A | b | ΔE, color difference |
|---|---|---|---|---|---|
| Inventive 1 | 4 | 80.09 | −7.86 | 31.72 | |
| Comparative 7 | 5 + Quinoline Yellow dye | 79.99 | −9.51 | 30.81 | 1.89 |
| Inventive 9 | 9 | 65.66 | 25.85 | 61.82 | |
| Comparative 8 | 5 + MACROLEX ORANGE R | 66.48 | 24.47 | 61.83 | 1.60 |
| Inventive 10 | 10 | 51.95 | 20.53 | −23.19 | |
| Comparative 9 | 5 + MACROLEX VIOLET 3R | 57.11 | 19.72 | −25.59 | 5.73 |

The ΔE listed for Comparative Composition Example 7 is calculated as the difference in color density between Inventive Composition Example 1 and Comparative Composition Example 7. The ΔE listed for Comparative Composition Example 8 is calculated as the difference in color density between Inventive Composition Example 9 and Comparative Composition Example 8. The ΔE listed for Comparative Composition Example 9 is calculated as the difference in color density between Inventive Composition Example 10 and Comparative Composition Example 9.

Test Methods

In addition to the test methods described above, test methods include the following:

D50 was measured according to ASTM E167-96 (Standard practice for Goniophotometry of objects and materials). D50 is the angle at which 50% output light intensity is measured.

Haze was measured according to ASTM D1003-00 (Standard test method for haze and luminous transmittance of transparent plastics).

LOI was measured according to ASTM D2863-12 (Standard Test Method for Measuring the Minimum Oxygen Concentration to Support Candle-Like Combustion of Plastics (Oxygen Index)).

Yellowness Index was measured according to ASTM E 313-00 (Standard practice for calculation yellowness and whiteness indices from instrumentally measured color coordinates).

The present invention may be embodied in other forms without departing from the spirit and the essential attributes thereof, and, accordingly, reference should be made to the appended claims, rather than to the foregoing specification, as indicating the scope of the invention.

We claim:

1. A light diffusing composition comprising:
a blended product of:
a matrix polymer; and
from 0.05 to 2.5 wt % diffuser polymer particles which comprise from 50 to 90 wt % units derived from at least one alkyl (meth)acrylate monomer, comonomers selected from the group consisting of aryl (meth)acrylate monomers and monovinyl arenes, and from 9 to 23 wt % units derived from crosslinking monomer selected from the group consisting of aliphatic crosslinking monomers, aromatic crosslinking monomers and combinations thereof,
wherein the diffuser polymer particles are characterized by an average diameter from 2 to 20 micrometers, a particle size distribution such that at least 90 wt % of the polymer particles fall within ±30% of the volume average particle size, a crosslinking level greater than 4%; and a refractive index, R1, from 1.40 to 1.70, and wherein the diffuser polymer particles exhibit a bimodal particle size distribution with a smaller particle size peak centered between 2.25 and 2.75 micrometers and a larger particle size peak centered between 5 and 6 micrometers; and
wherein from 0.1 to 20 wt % $TiO_2$ dispersed within the diffuser polymer particles based on the total weight of the diffuser particle, including the $TiO_2$.

2. The light diffusing composition according to claim 1, further comprising one or more flame retardants.

3. The light diffusing composition according to claim 2, wherein the matrix polymer comprises polycarbonate and wherein a plaque tested according to ASTM D2863-12 exhibits an LOI of at least 24%.

4. The light diffusing composition according to claim 1, wherein the crosslinking monomer is divinylbenzene.

5. The light diffusing composition according to claim 1, wherein the at least one alkyl (meth)acrylate monomer is methyl methacrylate.

6. The light diffusing composition according to claim 1, wherein the composition exhibits an increase of at least 50% in D50 angle in comparison to a comparative composition having an identical components as the composition except that the same amount of the $TiO_2$ is dispersed in the matrix polymer and not in the diffuser particles.

7. A lighting diffuser comprising the light diffusing composition according to claim 1.

8. The light diffusing composition according to claim 1, wherein the blended product is prepared by dry blending to produce a dry blended product.

9. The light diffusing composition according to claim 8, wherein the dry blended product is further melt compounded.

10. A method of producing a light diffusing composition comprising:
copolymerizing from 50 to 90 wt % at least one alkyl (meth)acrylate monomer, comonomers selected from the group consisting of aryl (meth)acrylate monomers and monovinyl arenes, and from 9 to 23 wt % crosslinking monomer selected from the group consisting of aliphatic crosslinking monomer, aromatic crosslinking monomer and combinations thereof in the presence of $TiO_2$ to form diffuser polymer particles; and
blending the diffuser polymer particles into a matrix polymer wherein the diffuser polymer particles are present in the composition at a level from 0.05 to 2.5 wt % based on the weight of the matrix polymer plus the weight of the diffuser polymer particle, wherein the diffuser polymer particles are characterized by an average diameter from 2 to 20 micrometers, a particle size distribution such that at least 90 wt % of the polymer particles fall within ±30% of the volume average particle size, a crosslinking level greater than 4% and a refractive index, R1, from 1.40 to 1.70, and wherein the diffuser polymer particles exhibit a bimodal particle size distribution with a smaller particle size peak centered between 2.25 and 2.75 micrometers and a larger particle size peak centered between 5 and 6 micrometers;
wherein the copolymerization process to produce the light diffusing particle is selected from the group consisting of suspension polymerization, emulsion polymerization, or a combination thereof; and
wherein the $TiO_2$ are non-polymerizable in the copolymerization process such that the $TiO_2$ are dispersed in the diffuser polymer particles, wherein the $TiO_2$ changes the refractive index by greater than 0.06 units.

11. An article comprising the light diffusing composition according to claim 1.

12. A method for making articles comprising forming the article from the light diffusing composition according to claim 1 wherein the forming the article comprises one or more processes selected from the group consisting of thermoforming, extruding, calendaring, injection molding, and combinations thereof.

13. The method according to claim 10, wherein the diffuser polymer particles exhibit a bimodal particle size distribution.

14. The method according to claim 13, wherein the bimodal particle size distribution includes a smaller particle size peak centered between 2.25 and 2.75µ and a larger particle size peak centered between 5 and 6µ.

15. The light diffusing composition of claim 1, wherein the crosslinking monomer is present in an amount of from 14 to 23 wt %.

* * * * *